Sept. 8, 1970   J. C. FUCHS   3,527,262
ROTATING PISTON CHAMBER ENGINE
Filed April 16, 1968   4 Sheets-Sheet 1
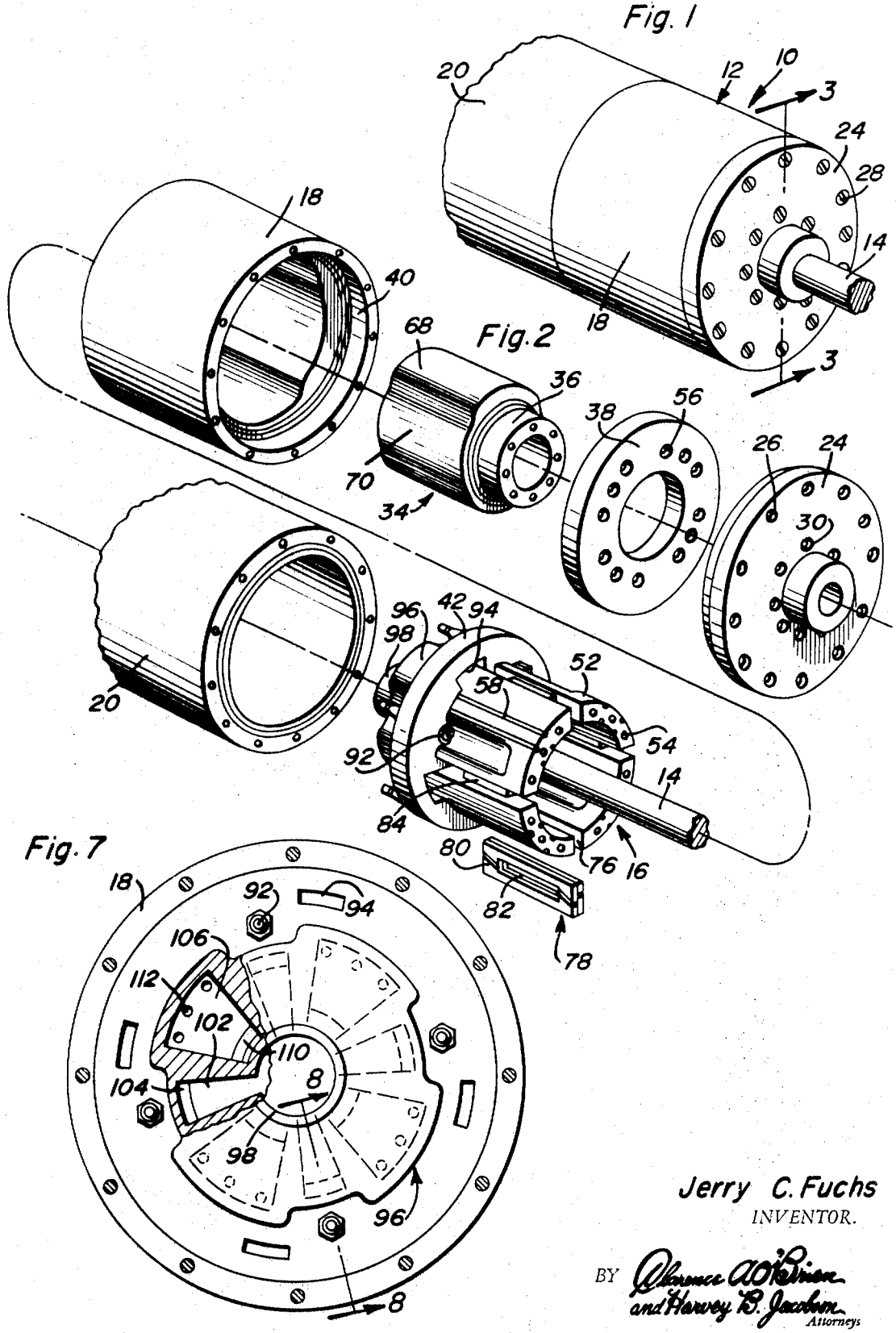
Jerry C. Fuchs
INVENTOR.

Sept. 8, 1970   J. C. FUCHS   3,527,262
ROTATING PISTON CHAMBER ENGINE
Filed April 16, 1968   4 Sheets-Sheet 2

Jerry C. Fuchs
INVENTOR.

BY
Attorneys

Sept. 8, 1970  J. C. FUCHS  3,527,262
ROTATING PISTON CHAMBER ENGINE
Filed April 16, 1968  4 Sheets-Sheet 3

Jerry C. Fuchs
INVENTOR.

BY *Clarence A. O'Brien*
and *Harvey B. Jacobson*
Attorneys

Sept. 8, 1970   J. C. FUCHS   3,527,262
ROTATING PISTON CHAMBER ENGINE
Filed April 16, 1968   4 Sheets-Sheet 4

Jerry C. Fuchs
INVENTOR.

BY Clarence A. O'Brien
and Harvey B. Jackson
Attorneys

United States Patent Office                                  3,527,262
                                                             Patented Sept. 8, 1970

3,527,262
ROTATING PISTON CHAMBER ENGINE
Jerry C. Fuchs, 1565 Glen Haven Drive,
Merritt Island, Fla. 32952
Filed Apr. 16, 1968, Ser. No. 721,693
Int. Cl. F02b 53/08, 53/12, 55/16
U.S. Cl. 123—8.43                                     7 Claims

ABSTRACT OF THE DISCLOSURE

A rotary combustion engine in which piston vanes are mounted by the rotor sequentially projecting into inner and outer chambers circumferentially spaced from each other and respectively intaking fuel charges rearwardly of the vanes and exhausting combustion products forwardly of the vanes in the direction of rotor rotation. On the opposite sides of the rotor vanes, fuel charges are compressed in the inner chambers and transferred to the outer chambers where they are expanded during combustion.

---

This invention relates to an internal combustion engine of the rotary piston vane type and more particularly to a rotary piston type of fluid expansion device whether it be an internal combustion engine, a pump or a fluid motor having a rotor assembly which movably mounts the piston vanes, fluid transfer passages, intake and exhaust ports.

Rotary piston vane engines are well known including those having intake and compression chambers which are separate from the expansion and combustion chambers to which fuel charges are transferred from the compression chambers through passages in the rotor or piston vanes. In such combustion engines, the intake ports, exhaust ports and ignition spark devices are fixedly mounted by the engine stator and therefore present bearing surface wear and lubrication leakage problems.

One of the important objects of the present invention therefore is to provide a rotary piston vane type engine in which the rotor mounts the intake and exhaust ports as well as the spark plugs in order to avoid any irregularities in the surfaces wipingly engaged by the piston vanes. Accordingly, the rotor encloses an intake manifold with which the intake ports communicate. This arrangement produces turbulence in the fuel mixture during rotation so as to enhance mixing of the fuel. Further, the expansion and combustion chambers into which the piston vanes project, are made volumetrically larger than the compression and intake chambers into which the piston vanes also project. The piston vanes may also act as their own lubricant pump for both engine and vane seal lubrication purposes.

In accordance with the present invention, the rotor includes an annular portion which carries the piston vanes in wiping engagement with radially inner and outer surfaces of an annular stator compartment. The annular rotor portion accordingly divides the stator compartment into radially inner and outer chambers circumferentially spaced from each other to form the aforementioned compression and expansion chambers. Fuel charges are accordingly drawn into the radially inner chambers through intake ports mounted by the rotor and combustion products expelled from the radially outer expansion chambers rearwardly of and forwardly of, respectively, the piston vanes during rotation of the rotor relative to the stator. Fuel charges on the other hand are compressed within the radially inner chambers forwardly of the piston vanes and expanded within the radially outer chambers rearwardly of the piston vanes in the direction of rotor rotation. The radially inner and outer chambers are circumferentially spaced so that the fuel charges when compressed may be transferred to the expansion chambers through passages formed in the rotor for this purpose. Spark plug devices may be mounted by the rotor adjacent the radially outer ends of the transfer passages in order to produce combustion within the expansion chambers and thereby accelerate expansion of the fluid within the radially outer chambers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of an engine constructed in accordance with the present invention.

FIG. 2 is a perspective view showing the disassembled parts of the engine illustrated in FIG. 1.

FIG. 7 is a transverse sectional view taken substantially through a plane indicated by section line 7—7 in FIG. 3 with a portion broken away and shown in section.

Figure 3:
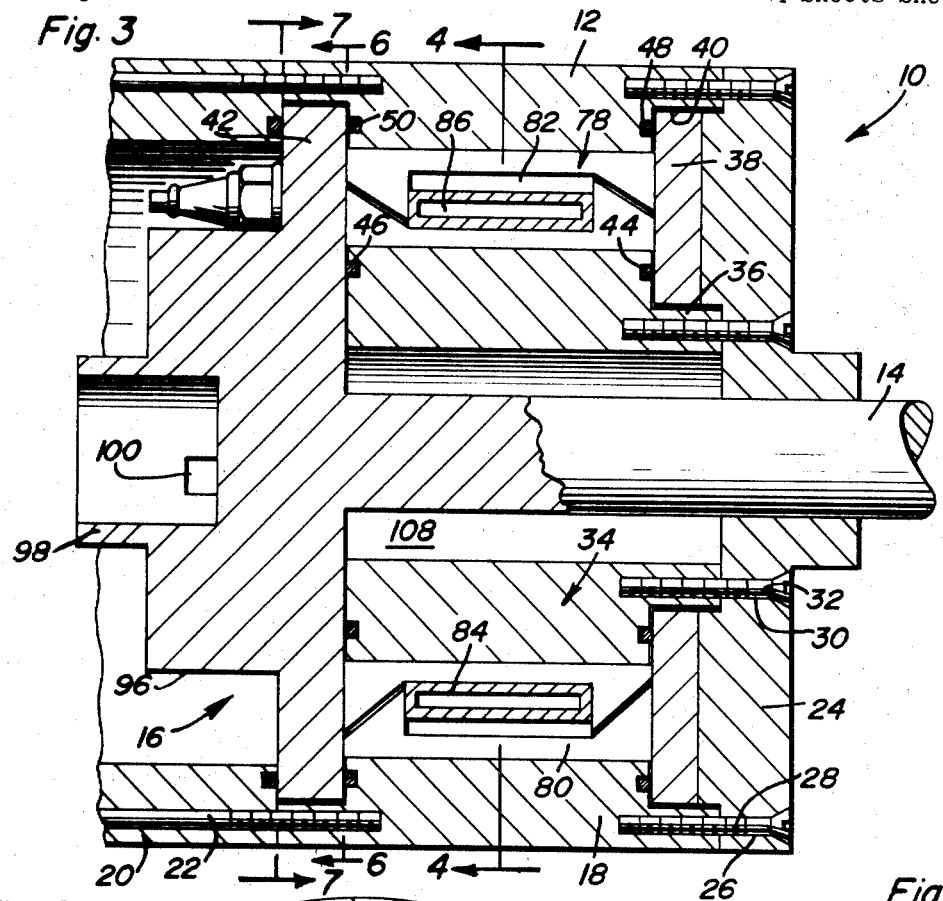
FIG. 3 is a longitudinal sectional view through the engine taken substantially through a plane indicated by section line 3—3 in FIG. 1.
Figure 6:
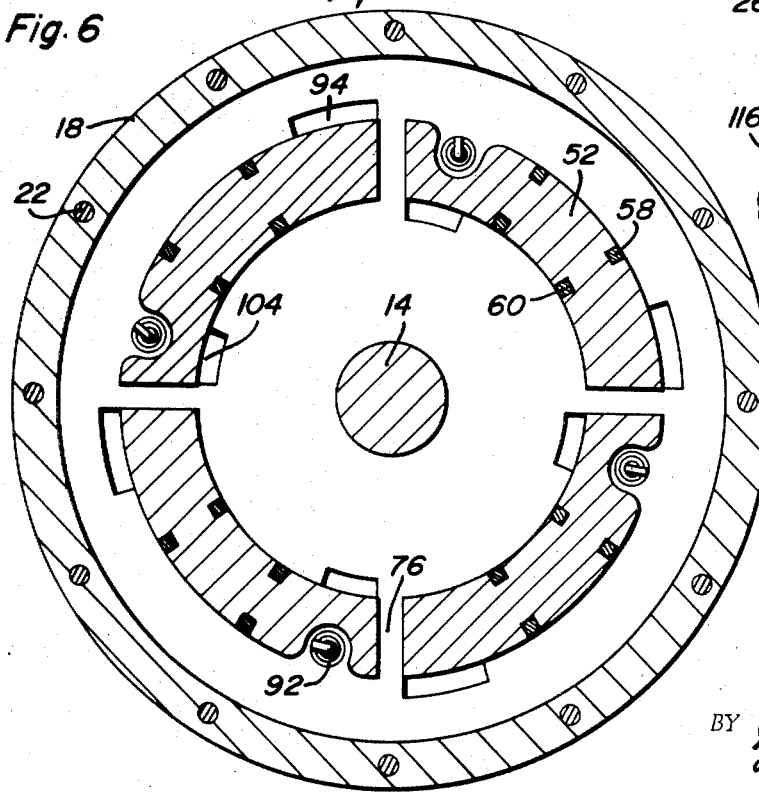
FIG. 6 is a transverse sectional view taken substantially through a plane indicated by section line 6—6 in FIG. 3.

Referring to the drawings in detail, and initially to FIGS. 1, 2 and 3, it will be observed that the fluid power device of the illustrated embodiment is an internal combustion engine generally referred to by reference numeral 10 having a stator assembly generally denoted by reference numeral 12 from which the power shaft 14 projects, the shaft being part of a rotor assembly generally referred to by reference numeral 16. The stator assembly includes an annular, rotor housing section 18 to which a manifold housing section 20 is secured by a plurality of fastener rods 22 that may be threadedly received in bores aligned between the abutting end faces of the housing sections 18 and 20. One end of the housing section 18 is closed by an end wall 24 having a radially outer series of apertures 26 through which the fasteners 28 extend into aligned threaded bores in the end face of the housing section 18. The end wall 24 is also provided with a radially inner series of apertures 30 through which the fasteners 32 extend for threaded reception within aligned bores formed in an end face of an inner vane guide member 34 which is fixed to the stator assembly. The end portion of the vane guide member 34 secured to the end wall 24 by the fasteners 32, is provided with a reduced diameter bearing surface portion 36 adapted to rotatably support a rotor disk 38 associated with the rotor assembly 16. An internal bearing surface portion 40 concentric with the bearing surface portion 36 is formed at the end portion of the housing section 18 and cooperates with the bearing portion 36 to form an annular bearing race for the rotor disk 38. The rotor assembly also includes a disk portion 42 which may be formed integral with the power shaft 14 in axially spaced relation to the rotor disk 38. The rotor disk 38 and disk portion 42 are axially spaced from each other by the housing section 18 and the vane guide member 34. Axially spaced, radially inner and outer grooves are accordingly formed in the housing section 18 and the vane guide member 34 seating O-ring sealing elements 44, 46, 48 and 50 in wiping engagement with the rotor disk 38 and disk portion 42 in order to pressure seal an annular compartment formed within the housing section 18 about the vane guide member 34.

Figure 4:
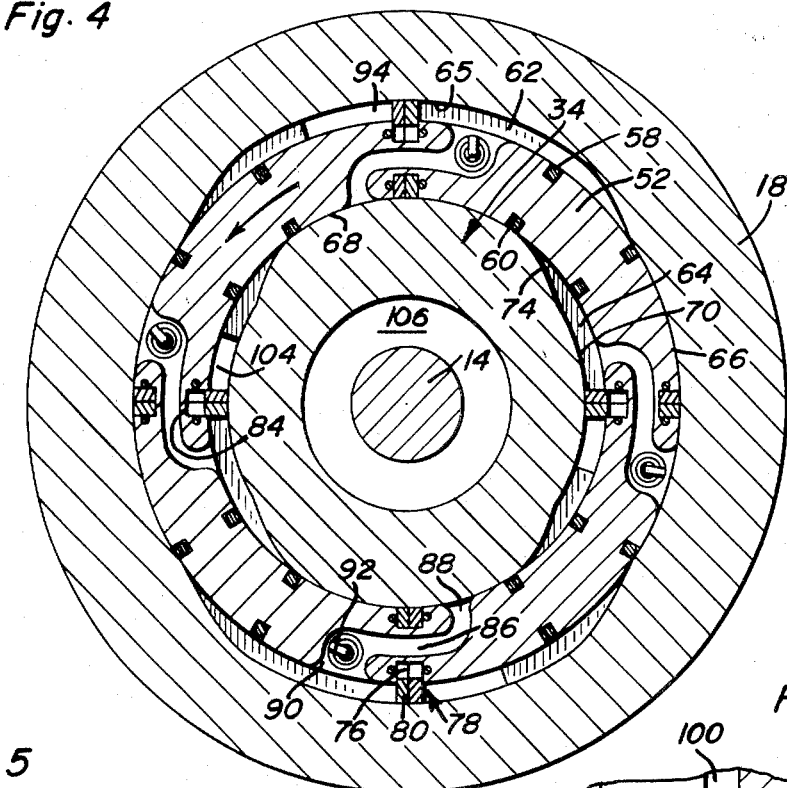
FIG. 4 is a transverse sectional view taken substantially through a plane indicated by section line 4—4 in FIG. 3.

Referring now to FIGS. 2, 3 and 4, it will be observed that the rotor assembly 16 also includes an annular portion 52 which may be integrally connected to and extend axially from the rotor disk portion 42 in radially spaced, concentric relation to the power shaft 14. The end faces of the annular rotor portion 52 are provided with bores 54 adapted to be aligned with apertures 56 formed in the rotor disk 38 so as to receive fasteners connecting the rotor disk to the annular portion 52. The annular portion is also provided with a plurality of circumferentially spaced sealing elements 58 and 60 on its radially outer and radially inner surfaces for wiping engagement with the internal surfaces of the housing section 18 and the external surfaces of the vane guide member 34. In the illustrated embodiment, the annular rotor portion 52 is cylindrical in shape so that its external and internal surfaces cooperate with the non-cylindrical, internal surface of the housing section 18 and external surface of the guide member 34 to form separate arcuate chambers 62 and 64. The internal surface of the housing section 18 in the illustrated embodiment is therefore formed with a pair of larger diameter portions 65 spaced 180° apart from each other and spaced 90° from a pair of smaller diameter portions 66 adapted to be wipingly engaged by the seal elements 58 on the rotor portion 52. Similarly, two larger diameter surface portions 68 are formed on the guide member 34 spaced 90° from the smaller diameter surface portions 70 in order to form the two radially inner chambers 64 which are circumferentially spaced from the two radially outer chambers 62 by 90°. It will of course be appreciated that the internal and external surfaces of the housing section and vane guide member may be designed so as to form more than two inner and outer chambers. Regardless of the number of chambers, the inner chambers will be circumferentially spaced from the outer chambers except for the transition surface portions 72 and 74 on the internal surface of the housing section and the external surface of the guide member where the chambers 62 and 64 overlap. The transition surface portions are such that the radial spacing between the housing section and the vane guide member is constant throughout even though the confronting surfaces are not cylindrical.

Figure 9:
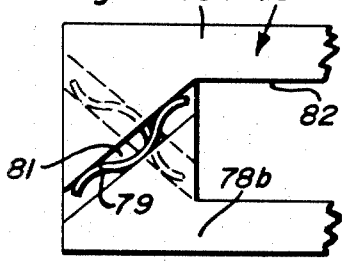
FIG. 9 is an enlarged side elevational view of one of the piston vane assemblies in the engine.

The annular rotor portion 52 is provided with a plurality of radial guide slots 76, four of such guide slots being shown in the illustrated embodiment. Each guide slot movably mounts a spring tensioned piston vane assembly generally referred to by reference numeral 78. Each vane assembly is made up of four vane sections to form a generally rectangular configuration. For each vane assembly, there are a pair of radially outer vane sections 78a and a pair of radially inner vane sections 78b as more clearly seen in FIG. 9. The vane sections are urged apart by springs 79 disposed in intersecting gaps 81. The vane sections also form an internal opening 82 about the connecting sections 84 within the guide slots 76 in order to accommodate the small radial displacement of the vane assemblies in response to relative rotation between the rotor and stator assemblies. Each vane assembly acts as a pump because of the change in volume within opening 82 on either side of connecting section 84. The sectional construction of the vane assemblies will also provide for better pressure sealed wiping engagement between the vane assemblies and the internal and external surfaces of the housing section and vane guide member. Toward this end, sealing elements are provided in the guide slots for wiping engagement with the sides of the vane assemblies. The vane assemblies project radially from the annular rotor portion 52 into wiping engagement with either the internal surface of the housing section 18 or the external surface of the guide member 34 so as to displace fluid either within the radially outer chambers 62 or the radially inner chambers 64 in response to relative rotation between the rotor and stator assemblies. Further, extending through the connecting portion 84 of each guide slot 76, is a transfer passage 86 having a radially inner end 88 closely spaced on the forward side of the piston vane assembly 78 and a radially outer end 90 closely spaced on the rearward side of the piston vane assembly in the direction of rotation of the rotor assembly relative to the stator assembly. Fluid is thereby transferred from the radially inner chambers to the radially outer chambers as will be hereafter explained. Projecting into each of the transfer passages 86 adjacent the radially outer ends 90, are spark ignition devices 92.

Each of the spark ignition devices 92 is fixedly mounted in the rotor disk portion 42 through which it axially projects and is adapted to be electrically connected through suitable brush devices (not shown) to a timed ignition controlling system (not shown). With reference to FIGS. 4, 6, 7 and 8, it will be observed, that the spark ignition devices 92 when ignited will produce combustion within the radially outer chambers 62 rearwardly of the piston vane assemblies 78 in the direction of rotor rotation. Formed in the rotor disk portion 42 on the forward side of the piston vane assemblies, are exhaust ports 94 through which combustion products are expelled by the piston vane assemblies from the radially outer chambers into the housing section 20. The exhaust ports are formed in the rotor disk portion 42 radially outwardly of an intake manifold section 96 of the rotor assembly to which a fuel mixture is supplied through an axially projecting tubular portion 98. The axially inner end of the tubular portion 98 is provided with circumferentially spaced inlet openings 100 that open into angularly spaced, fuel passages 102 as more clearly seen in FIGS. 7 and 8. Each fuel passage 102 communicates at its radially outer end with an intake port 104. Each intake port is radially spaced from the rotational axis of the rotor assembly a distance so as to be aligned with one of the radially inner chambers 64 just rearwardly of the piston vane assembly associated therewith on the side of the same piston assembly opposite the exhaust ports 94 radially aligned with the radially outer chambers 62. The rotor manifold section 96 is also provided with lubricant passages 106 as shown in FIG. 7 angularly spaced between the fuel passages 102. These lubricant passages 106 establish fluid communication between the annular lubricant space 108 disposed about the power shaft 14 and the radially inner chambers 64 through the radially inner ports 110 and the radially outer lubricant ports 112 communicating with the lubricant passages 106 in the manifold section. Thus, during rotation of the rotor, lubricant may be circulated for engine and piston vane lubrication purposes by the aforementioned pumping action of the vane assemblies.

Figure 10:
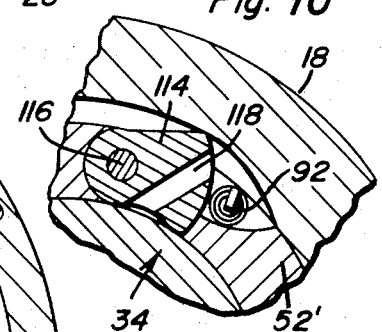
FIG. 10 is an enlarged partial sectional view showing a modification of the engine illustrated in FIGS. 1–8.

In FIG. 10, the engine hereinbefore described is modified by replacement of the radially sliding type vane assemblies by pivotal piston vane members 114. The annular rotor portion 52′ of this modified form of the engine therefore pivotally mounts the piston vane members by means of the pivot pins 116. The piston vane members 114 are pivotally displaceable during rotation of the rotor assembly in view of its wiping engagement with both the internal surface of the housing section 18 and the external surface of the piston guide member 34. A transfer passage 118 is formed in each of the piston vane members 114 in order to conduct fluid from the radially inner to the radially outer chambers. Also, the annular rotor portion 52' mounts the spark plug devices 92 in close spaced relation to each of the piston guide members 114. The engine is otherwise similar in construction and operation to that hereinbefore described.

Figure 5:
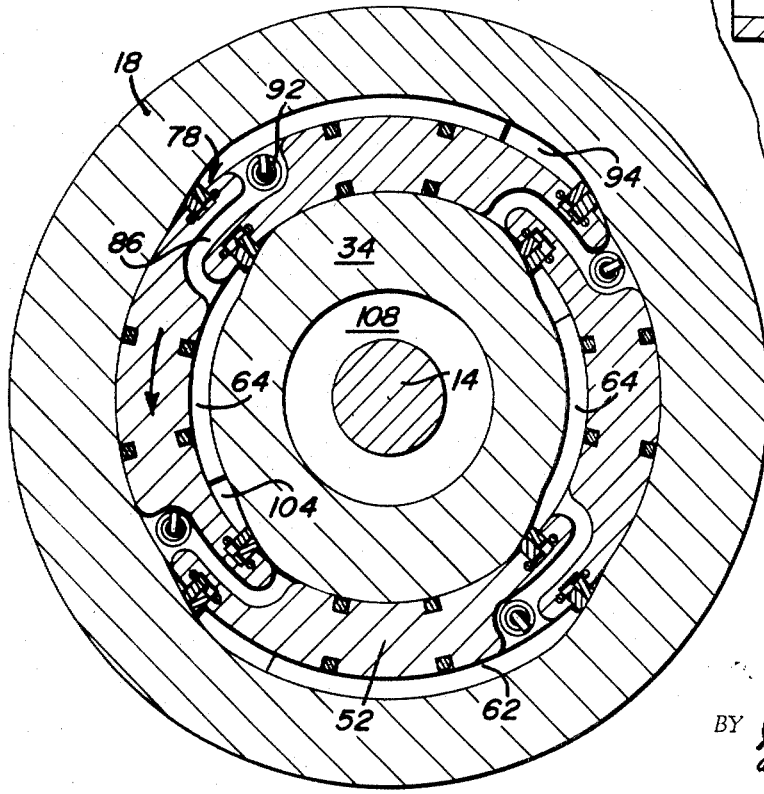
FIG. 5 is a transverse sectional view similar to FIG. 4 but showing the engine in another operational phase position.
Figure 8:
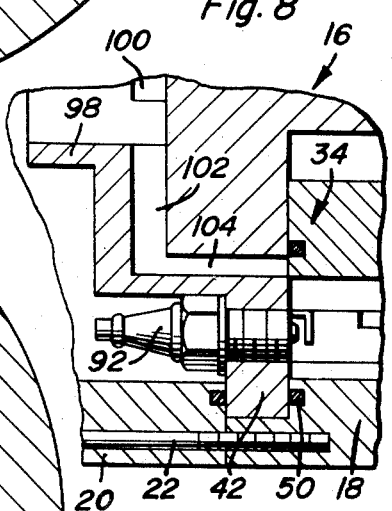
FIG. 8 is an enlarged partial sectional view taken substantially through a plane indicated by section line 8—8 in FIG. 7.

From the foregoing description, the construction of the rotary piston engine will be apparent. During operation of the engine, a fuel mixture supplied to the rotor manifold section 96 through the tubular portion 98 will be thoroughly mixed because of the turbulence produced in response to rotation of the rotor relative to the stator assembly. Flow of fuel charges enhanced by centrifugal action due to rotation of the rotor assembly is accordingly fed through the fuel passages 102 in the manifold section 96 and the intake ports 104 to the radially inner chambers 64. Since the intake ports 104 are disposed rearwardly of the piston vane assemblies 78, as illustrated in FIG. 4, the expansion of the space rearwardly of the piston vane assemblies within the radially inner chambers produces a suction pressure constituting the primary inducement for inflow of the fuel mixture into the radially inner chambers. At the same time, the spaces within the radially outer chambers 64 forwardly of the piston vane assemblies are being reduced in volume. Accordingly, combustion products previously formed within the radially outer chambers on the forward sides of the piston vane assemblies are expelled by the piston vane assemblies from the radially outer chambers through the exhaust ports 94 in the position of the rotor assembly relative to the stator assembly as shown in FIG. 4. In this phase position, the radially outer and inner chambers are not in fluid communication with each other. Accordingly, the spaces within the radially inner chambers forwardly of two of the piston assemblies will be compressing charges of fuel previously supplied to the spaces while the fuel charges previously transferred to the spaces within the radially outer chambers rearwardly of the piston vane assemblies are being expanded. At this point, two of the ignition spark devices 92 associated with the two radially outer chambers within which fuel is being expanded, may be operated to produce combustion which will accelerate expansion and hence rotation of the rotor assembly. As the rotor assembly approaches the phase position illustrated in FIG. 5 from the position shown in FIG. 4, the fuel charges being compressed forwardly of two of the piston vane assemblies within the inner chambers 64, are substantially transferred to the transfer passages 86 which begin to communicate at their radially outer ends with the radially outer chambers 62 rearwardly of the same two piston vane assemblies. At the same time, the intake ports 104 disposed rearwardly of these piston vane assemblies begin to close. The exhaust ports 94 through which combustion products were being previously displaced at this point are also almost substantially closed while the other two exhaust ports are almost fully opened. Continued rotation of the rotor assembly from the position illustrated in FIG. 5 will therefore effect transfer of the compressed fuel charges from the radially inner chambers into the expanding spaces of the radially outer chambers rearwardly of the piston vane assemblies until the cycle is completed. It will also be appreciated, that two power cycles will occur during each revolution of the rotor assembly for each piston vane assembly.

Figure 11:
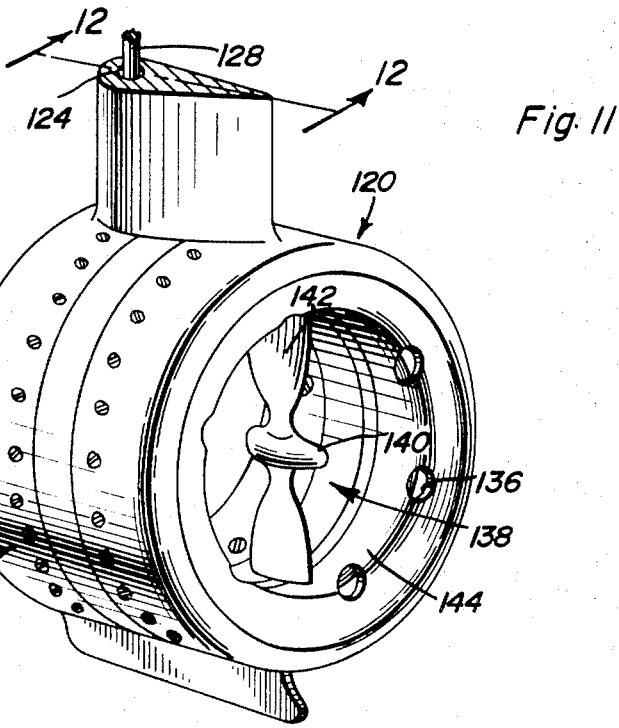
FIG. 11 is a perspective view of a marine propulsion version of the engine.
Figure 12:
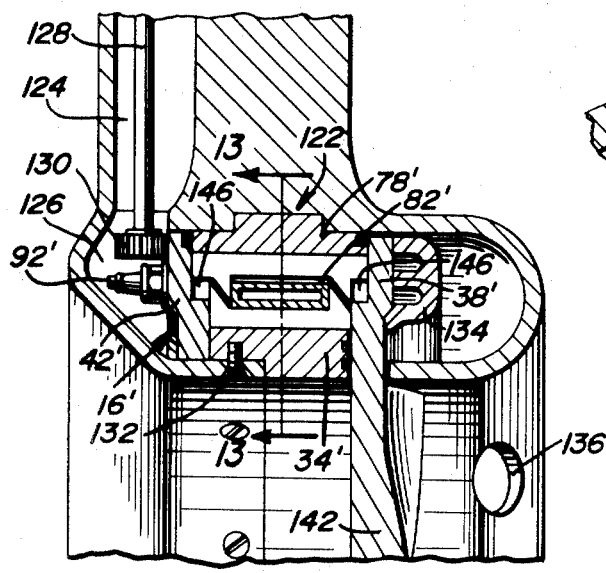
FIG. 12 is an enlarged partial sectional view taken substantially through a plane indicated by section line 12—12 in FIG. 11.
Figure 13:
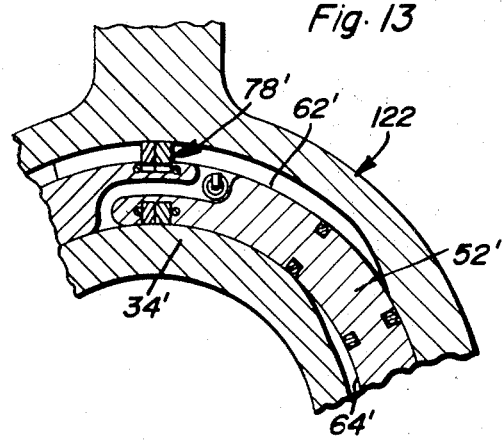
FIG. 13 is a partial sectional view taken substantially through a plane indicated by section line 13—13 in FIG. 12.

FIGS. 11, 12 and 13 show another embodiment of the engine generally referred to by reference numeral 120, suitable for marine propulsion purposes. In this engine, a hollow, annular housing 122 is connected to a vertical supporting strut within which a passage 124 is formed to conduct a fuel mixture to the annular intake manifold 126. A timing control shaft 128 extends through the passage 124 for operating suitable ignition control mechanism (not shown) controlling operation of the spark plugs 92' mounted on the rotor assembly 16' from which shaft 128 is driven through pinion gear 130. The rotor assembly includes disk portions 38' and 42' on opposite axial sides of the radially inner guide member 34' fastened to the housing by fasteners 132 with which the piston vane assemblies 78' are in wiping engagement. The vane assemblies are slidably mounted in wiping engagement with the housing by the annular rotor portion 52' interconnecting the disk portions 38' and 42'. The rotor portion 52' thus separates radially outer chambers 62' from dimensionally narrower inner chambers 64' as more clearly seen in FIG. 13.

The foregoing parts of engine 120 operate in a manner similar to the corresponding parts as described in connection with engine 10 illustrated in FIGS. 1 through 9. However, exhaust gases from the radially outer combustion chambers are conducted through exhaust ports in disk 38' into an exhaust manifold 134 designed to prevent entry of water into the combustion chambers. The exhaust gases are discharged from the outer housing 122 through outlets 136. Also the output shaft is replaced by a propeller assembly 138 which includes a hub 140 concentrically positioned relative to the annular housing. Blades 142 extend radially outwardly from the hub and are connected to the disk portion 38' of the rotor assembly. Thus operation of the engine causes rotation of the propeller to induce axial flow through the central passage 144 formed by the housing for propulsion purposes.

It will also be apparent from the foregoing description, that the volume of each radially outer combustion chamber is larger than the volume of each radially intake inner chamber. Further, the volumetric difference may be increased by increasing the radial width of the radially outer chambers relative to the radially inner chambers as shown in FIGS. 12 and 13. As the piston vane assemblies alternately project into the radially inner and radially outer chambers, a vane pumping action occurs because of the change in volume of spaces 146 as well as the volume change of opening 82' to circulate lubricant as aforementioned in connection with FIGS. 1–8. Furthermore, by appropriate selection of the volumetric differences between the radially inner and outer chambers, engine temperature and efficiency as well as lubricant circulating pressure may be controlled. It is also important to note that the engine construction avoids stator mounted intake and exhaust ports thereby substantially eliminating the problems created by surface irregularities otherwise present over which the piston vanes move. Mounting of the ports by the rotor assembly also takes advantage of turbulence produced by rotor rotation enhancing the mixing of the fuel prior to combustion. Although the device as disclosed is limited to an internal combustion engine because of the spark ignition devices, it should be appreciated that these could be eliminated if the device is to be utilized as a fluid pump or as a fluid motor. Further, it will be appreciated that either the stator or the rotor assembly may be held stationary.

What is claimed as new is as follows:

1. A fluid power device comprising a stator, a rotor enclosed by the stator, a piston vane movably mounted by the rotor, said stator having radially spaced, non-cylindrical surfaces which with said rotor form separate pressure chambers of different volume, passage means mounted in the rotor for rendering the vane operative to intake fluid into one of said chambers and exhaust fluid from the other of the chambers in response to relative rotation between the rotor and the stator, means mounted in the rotor for radially transferring fluid compressed in said one of the chambers to the other of said chambers in which the fluid is expanded and means mounted in the rotor for producing combustion of the compressed fluid transferred to the other of said chambers to accelerate expansion thereof within said other of said chambers.

2. The combination of claim 1 wherein said passage means includes an intake port in the rotor communicating with said one of the chambers on one side of the vane and an exhaust port in the rotor on the other side of the vane communicating with the other of the chambers.

3. The combination of claim 2 wherein said fluid transferring means comprises a passage formed in the rotor and extending through the piston vane to communicate with both of said chambers on opposite sides of the vane.

4. A fluid power device comprising a stator, a rotor enclosed by the stator, a piston vane movably mounted by the rotor, said stator having radially spaced, non-cylindrical surfaces which with said rotor form separate pressure chambers of different volume, passage means mounted in the rotor for rendering the vane operative to intake fluid into one of said chambers and exhaust fluid from the other of the chambers in response to relative rotation between the rotor and the stator, and means mounted in the rotor for radially transferring fluid compressed in said one of the chambers to the other of said chambers in which the fluid is expanded, said passage means including an intake port in the rotor communicating with said one of the chambers on one side of the vane and an exhaust port in the rotor on the other side of the vane communicating with the other of the chambers.

5. The combination of claim 4 wherein said fluid transferring means comprises a passage formed in the rotor and extending through the piston vane between said chambers on opposite sides of the vane.

6. A fluid power device comprising a stator, a rotor enclosed by the stator, a piston vane movably mounted by the rotor, said stator having radially spaced, non-cylindrical surfaces which with said rotor form separate pressure chambers of different volume, passage means mounted in the rotor for rendering the vane operative to intake fluid into one of said chambers and exhaust fluid from the other of the chambers in response to relative rotation between the rotor and the stator, and means mounted in the rotor for radially transferring fluid compressed in said one of the chambers to the other of said chambers in which the fluid is expanded and said fluid transferring means comprising a passage formed in the rotor and extending through the piston vane to communicate with both of said chambers on opposite sides of the vane.

7. The combination of claim 6 including means mounted in the rotor for producing combustion of the compressed fluid transferred to the other of said chambers to accelerate expansion thereof within said other of said chambers.

References Cited

UNITED STATES PATENTS

| 1,999,187 | 4/1935 | Gerlat et al. | |
|---|---|---|---|
| 2,965,288 | 12/1960 | Butler | 230—158 |
| 3,358,439 | 12/1967 | De Castelet. | |
| 282,001 | 7/1883 | Kissam | 91—66 |
| 746,420 | 12/1903 | Walley | 91—66 |
| 1,253,716 | 1/1918 | Palmer | 91—66 |
| 1,602,018 | 10/1926 | Harvey. | |

MARK NEWMAN, Primary Examiner

A. D. HERRMANN, Assistant Examiner

U.S. Cl. X.R.

418—13, 143, 174, 184